(12) United States Patent
Aderholt et al.

(10) Patent No.: US 7,066,193 B2
(45) Date of Patent: Jun. 27, 2006

(54) POPPET SHEAR PROTECTION APPARATUS AND SYSTEM

(76) Inventors: Steven K. Aderholt, 4200 Palacio Dr., Amarillo, TX (US) 79019; Franklin B. Piehl, 1000 Ranch Rd. 2381, Bushland, TX (US) 79012; Dennis C. Hatfield, 8203 Paragon, Amarillo, TX (US) 79119

( * ) Notice: Subject to any disclaimer, the term of this patent is extended or adjusted under 35 U.S.C. 154(b) by 311 days.

(21) Appl. No.: 10/436,334

(22) Filed: May 12, 2003

(65) Prior Publication Data

US 2004/0226604 A1  Nov. 18, 2004

Related U.S. Application Data

(60) Provisional application No. 60/465,106, filed on Apr. 24, 2003.

(51) Int. Cl.
  *F16K 17/36* (2006.01)
(52) U.S. Cl. ............................. 137/71; 137/68.14
(58) Field of Classification Search ............ 137/68.14, 137/71
  See application file for complete search history.

(56) References Cited

U.S. PATENT DOCUMENTS

| 1,136,606 | A | * | 4/1915 | Loyd et al. | 137/71 |
|---|---|---|---|---|---|
| 1,525,775 | A | * | 9/1925 | Floyd et al. | 137/71 |
| 1,698,616 | A | * | 1/1929 | Woodham | 137/71 |
| 3,874,400 | A | * | 4/1975 | Groh | 137/71 |
| 3,930,517 | A | * | 1/1976 | Gagala | 137/71 |
| 4,077,422 | A | * | 3/1978 | Brinkley et al. | 137/68.14 |
| 4,907,617 | A | * | 3/1990 | Whalen | 137/71 |
| 5,103,853 | A | * | 4/1992 | McGushion et al. | 137/71 |
| 5,144,973 | A | * | 9/1992 | Green et al. | 137/71 |
| 5,894,859 | A | * | 4/1999 | Pavlicek | 137/460 |
| 5,941,268 | A | * | 8/1999 | Ross, Jr. | 137/68.14 |
| 6,142,346 | A | * | 11/2000 | Aderholt et al. | 137/68.21 |
| 6,742,538 | B1 | * | 6/2004 | Aderholt et al. | 137/68.12 |

* cited by examiner

*Primary Examiner*—John Rivell

(57) ABSTRACT

A springless shear protection device for use with a valve, the device comprising a poppet, the poppet including a bore. The poppet including first and second openings at distal ends of the poppet. A seat plug is disposed in the poppet bore, the seat plug is moveable within the poppet bore. A shear tube with first and second ends extending through the first opening of the poppet, the first end abutting the seat plug through the first opening of the poppet and the shear tube displacing the seat plug from the top of the poppet bore. The poppet is attachable to the valve and when attached a compressed gas or liquid passes through the poppet into the valve. When the shear tube is removed, the seat plug forcibly engages the top of the poppet bore and the seat plug blocks the flow of the compressed gas or liquid.

26 Claims, 10 Drawing Sheets

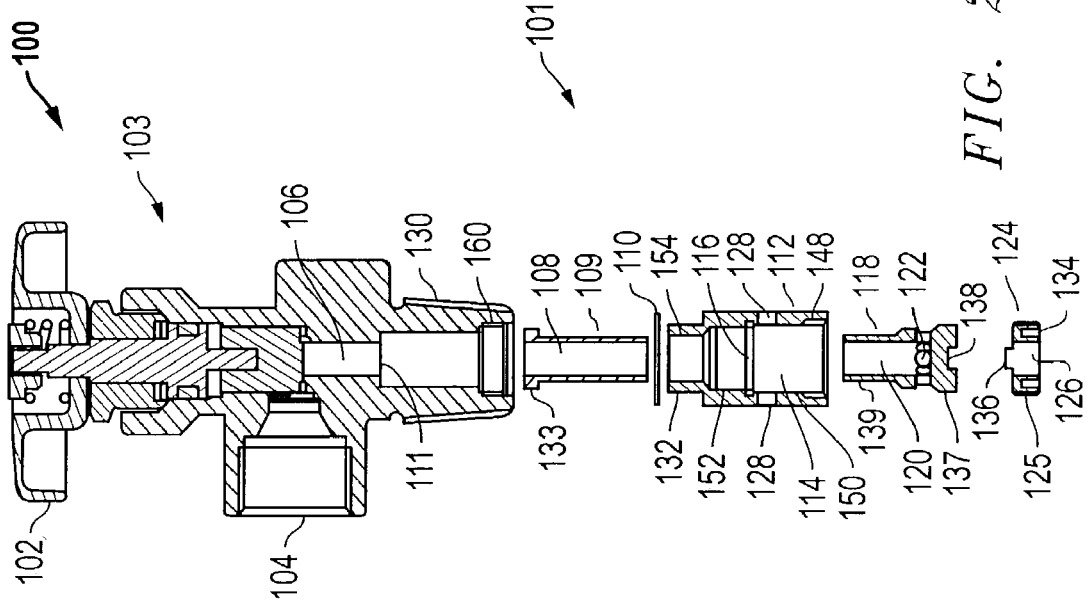
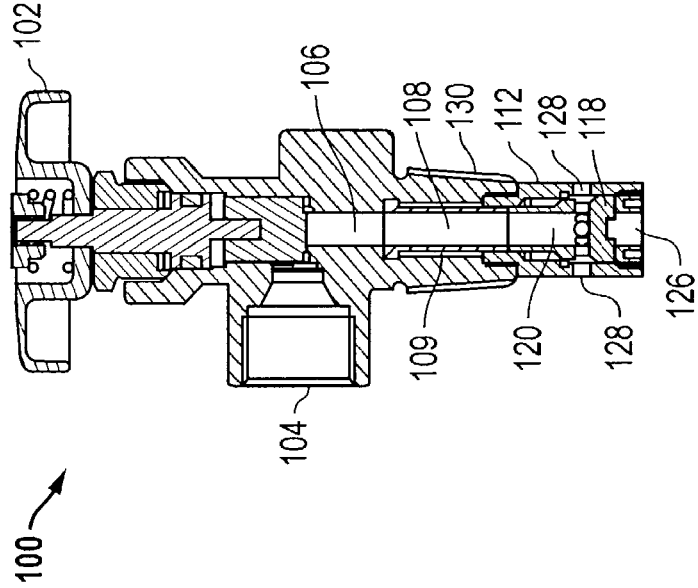
FIG. 2A
FIG. 2B

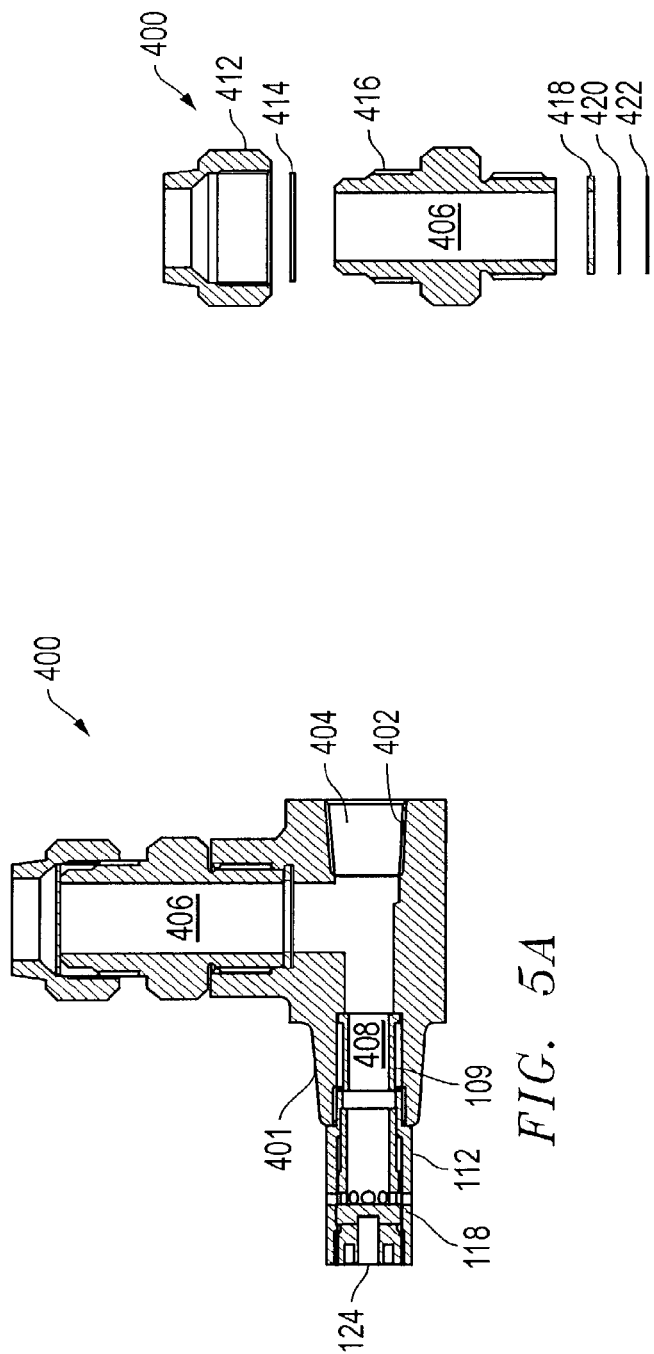
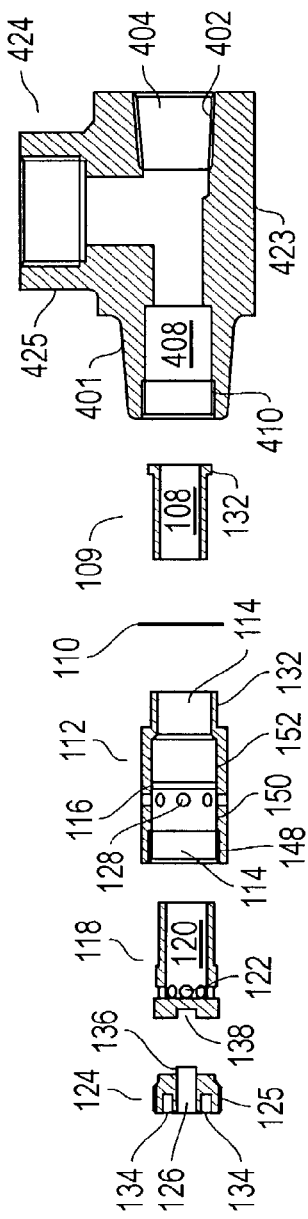
FIG. 5A
FIG. 5B

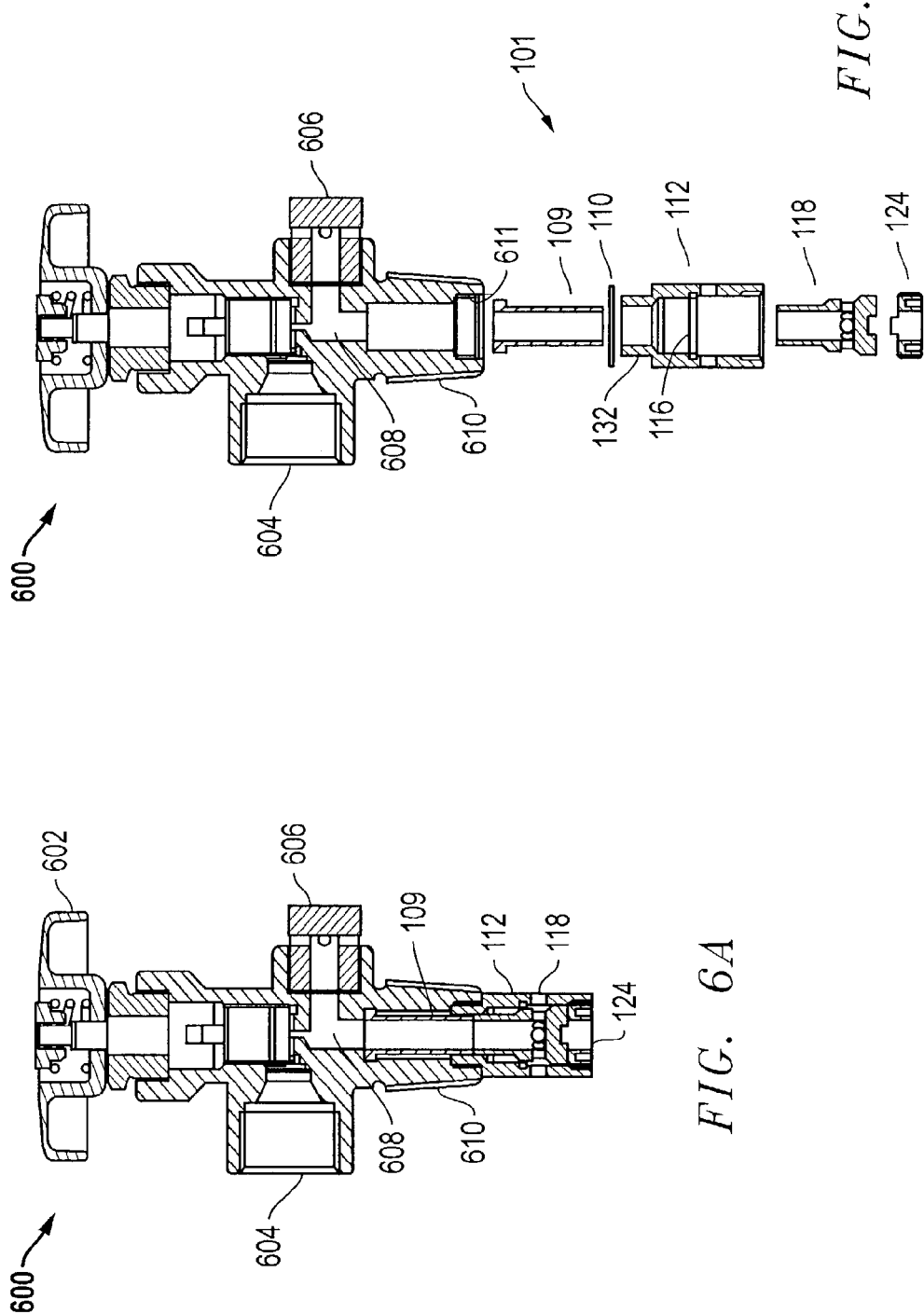

POPPET SHEAR PROTECTION APPARATUS AND SYSTEM

CROSS-REFERENCE TO RELATED APPLICATIONS

This application claims the priority benefit of U.S. Provisional Applications for Patent, Ser. No. 60/465,106, entitled "Poppet Shear Apparatus and System," filed Apr. 24, 2003, by Steven K. Aderholt, Franklin B. Piehl and Dennis C. Hatfield which is hereby incorporated by reference for all purposes.

STATEMENT REGARDING FEDERALLY SPONSORED RESEARCH/DEVELOPMENT

Not Applicable

FIELD OF THE INVENTION

The present invention relates generally to shear protection devices for tanks containing high-pressure gases. More specifically, the present invention relates to shear protection devices for truck-borne and stand-alone compressed gas cylinders.

BACKGROUND

Various types of compressed gases are commonly transported in long, narrow cylinders, or "tubes," mounted directly on a tractor trailer chassis or in a "module," or a box frame containing the cylinders that is loaded onto a flat bed trailer. These truck-borne compressed gas cylinders are often required by law to be fitted with relief devices designed to relieve pressure from the compressed gas cylinders in the event of cylinder over-pressurization or fire. These relief devices are typically attached to each end of a cylinder and take two major forms: cluster-type relief devices (typically for hazardous gases) and angle-type relief devices (typically for non-hazardous gases). The relief devices typically protrude from the compressed gas cylinders and are subject to shearing forces. These relief devices provide protection for over pressurization, however, due to their physical structure, are prone to inadvertent damage such as having the relief device sheared off of the compressed gas cylinder. When such a shearing of a valve or relief device occurs, the compressed gas escapes through an uncontrolled opening in the compressed gas cylinder to the atmosphere.

In U.S. Pat. No. 5,832,947, entitled "Gas Shut-Off and Pressure Relief Valve for a High Pressure Gas Vessel," issued to Andrew Niemczyk, a pressure relief valve is disclosed. The disclosed pressure relief valve has a threaded body that engages the side port in fluid communication with the gas passage. The side port has a radially extending shoulder that seats an annular sealing ring. A rupture disc, made from brass, is pressed by the threaded body against the sealing ring. During operation, the gas shut-off and pressure relief valve extends away from the compressed gas cylinder. The relief valve provides protection from an unintentional over pressurization; however, the protrusion of the relief valve increases the probability of an inadvertent shear of the relief valve.

In U.S. Pat. No. 4,269,214, entitled "Safety Pressure Relief Device," issued to Calvin. C. Forsythe, et al., a safety pressure relief device is disclosed. The disclosed safety pressure relief device has a casing with a threaded connection and a concentric axial bore there through. The open end of the casing engages a concave-convex rupture disc which is ruptured with a knife means including a plurality of spaced cutting teeth. An annular outlet ring is connected to the casing by a continuous heli-arc weld. The weld also connects the rupture disc and the knife means to the casing. Again, protection is provided for an over pressurization. However, the probability of an inadvertent shear of the relief device is increased.

FIG. 1 illustrates another prior art relief device and its attachment to a compressed gas cylinder. The relief device 20 does not attach directly to the cylinder 10. Rather, the relief device 20 screws into a "bullplug" 30, which itself screws into the cylinder 10. Thus, the bullplug 30 has two sets of threads: a set of male straight threads 32 that engage a reciprocal female set 12 in the cylinder; and a set of female pipe threads 34 that engage a reciprocal set of male pipe threads 24 on the relief device 20. Moreover, having the relief device 20 screw into the bullplug 30, which in turn screws into the cylinder 10, means that the relief device 20 protrudes farther from the cylinder 10 than it would if the relief device 20 screwed directly into the cylinder 10. This greater protrusion presents a greater opportunity for a shear of the relief device 20 from the cylinder 10 in the event of an accident, resulting in uncontrolled compressed gas leakage.

Therefore, a need exists for a shear protection device that couples directly to its associated compressed gas tank utilizing a valve or relief device, thereby lessening the likelihood of a valve or relief device shear—and the associated uncontrolled leakage—in the event of an accident.

Accordingly, it is an object of the present invention to provide a shear protection device for compressed gas cylinders that attaches directly to its cylinder. It is a further object of this invention to provide a shear protection device that attaches directly to relief devices for compressed gas cylinders that reduces or eliminates the likelihood of the uncontrolled compressed gas leakage due to the valve or relief device shearing away from the main body in the event of an accident.

SUMMARY

The present invention is a springless shear protection device including a poppet, a seat plug and a retainer plug. The poppet is substantially a tube with a bore and with downstream and upstream openings where the diameter of the upstream opening in larger than the diameter of the seat plug and the diameter of the downstream opening is smaller than the diameter of the seat plug. The poppet further includes ventilation openings around the circumference of the poppet. The ventilation openings allowing a compressed gas or liquid to pass through the poppet into the bore for passage to a valve.

A seat plug is inserted through the upstream end of the poppet and moves within the poppet bore. A retainer plug is attached at the upstream end of the poppet, substantially closing off the upstream opening and blocking the exit of the seat plug through the upstream opening. The retainer plug includes an opening to allow for the compressed gas or liquid to forcibly abut the seat plug.

A valve with a threaded attachment is also shown. The valve includes an inlet. A shear tube is attached within the inlet of the valve. The poppet is attached to the valve inlet so that the upstream opening is inserted into the inlet of the valve. When the poppet is attached, the shear tube forcibly engages the seat plug causing the seat plug to engage the retaining plug. When the seat plug is engaging the retaining plug, the compressed liquid or gas can pass through the ventilation openings of the poppet and pass through the valve inlet.

If the valve is sheared away, the internal force of the compressed gas or liquid forces the seat plug away from the retainer plug towards the downstream opening. The seat plug then engages the top of the bore of the poppet, blocking the passage of the compressed gas or liquid through the ventilation openings through the valve inlet.

BRIEF DESCRIPTION OF THE DRAWINGS

For a more complete understanding of the present invention, and for further details and advantages thereof, reference is now made to the following Detailed Description taken in conjunction with the following drawings, in which:

FIG. 2a is a side view of a valve and a springless shear protection device according to one embodiment of the present invention;

FIG. 2b is an exploded side view of a valve and a springless shear protection device according to one embodiment of the present invention;

FIG. 5a is a side view of an alternate valve and a springless shear protection device according to another embodiment of the present invention;

FIG. 5b is an exploded side view of an alternate valve and a springless shear protection device according to another embodiment of the present invention;

FIG. 6a is a side view of an alternate valve and a springless shear protection device according to another embodiment of the present invention;

FIG. 6b is an exploded side view of an alternate valve and a springless shear protection device according to another embodiment of the present invention;

DETAILED DESCRIPTION OF THE INVENTION

Figure 1:
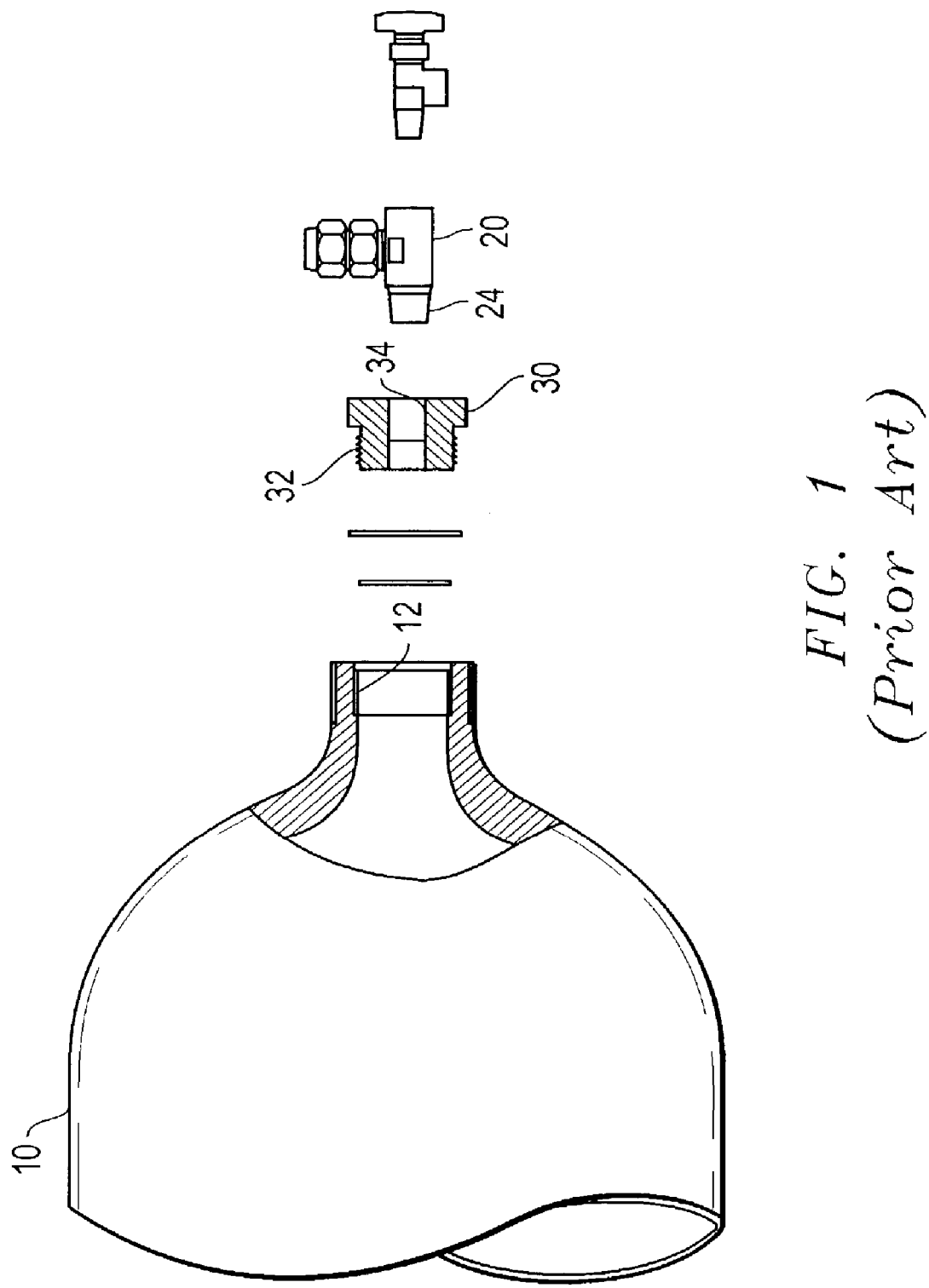
FIG. 1 is an exploded view of a prior art angle-type relief device's interaction with its associated compressed gas cylinder.

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

The present invention comprises generally a springless shear protection device, a valve, a threaded connection for coupling the springless shear protection device and valve to a compressed gas cylinder, and a seat plug that seals the cylinder outlet in the event of shearing of the valve. This disclosure describes numerous specific details that include specific structures, their arrangement, and functions in order to provide a thorough understanding of the present invention. One skilled in the art will appreciate that one may practice the present invention without these specific details.

An improved valve and springless shear protection device for high pressure gas cylinders directly engages the cylinder. A bore within the poppet of the springless shear protection device is in fluid communication with the pressurized cylinder contents. When shearing of the valve occurs, a seat plug disposed in the poppet seals the bore preventing the uncontrolled escape and possible ignition of the pressurized cylinder contents.

Figure 2C:
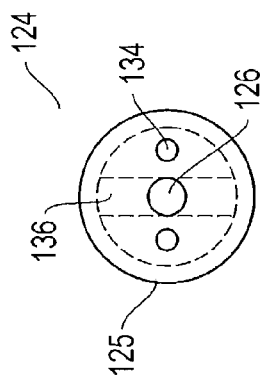
FIG. 2c is a top view of a retainer plug of the springless shear protection device according to one embodiment of the present invention.
Figure 2D:
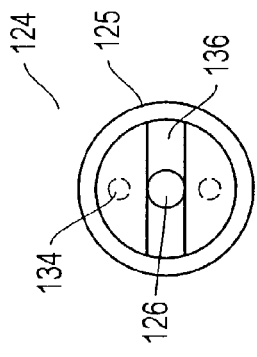
FIG. 2d is a bottom view of a retainer plug of the springless shear protection device according to one embodiment of the present invention.
Figure 2E:
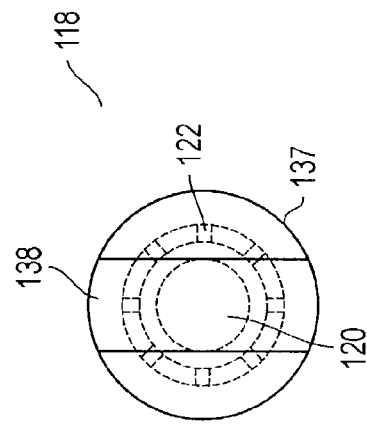
FIG. 2e is a top view of a seat plug of the springless shear protection device according to one embodiment of the present invention.
Figure 2F:
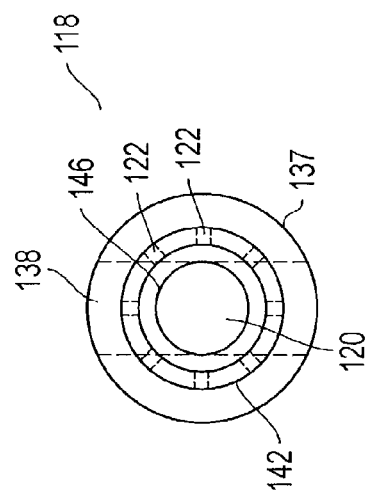
FIG. 2f is a bottom view of a seat plug of the springless shear protection device according to one embodiment of the present invention.
Figure 2H:
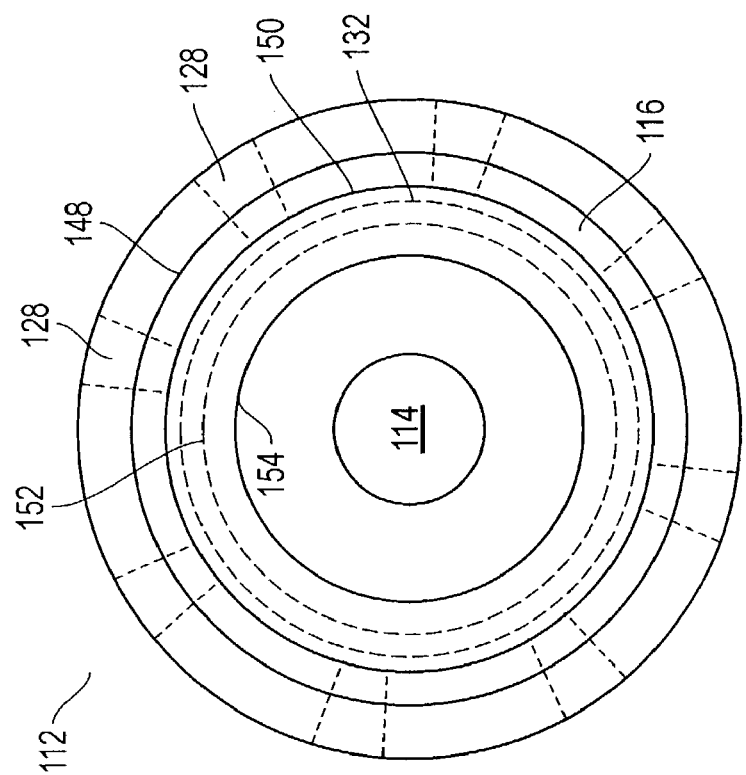
FIG. 2h is a bottom view of a poppet of the springless shear protection device according to one embodiment of the present invention.
Figure 2G:
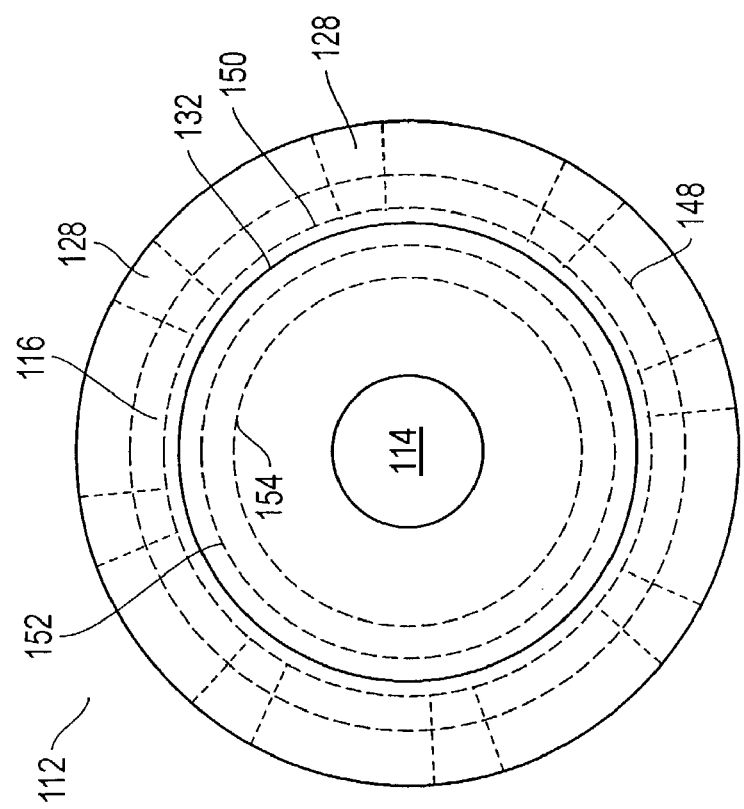
FIG. 2g is a top view of a poppet of the springless shear protection device according to one embodiment of the present invention.
Figure 3:
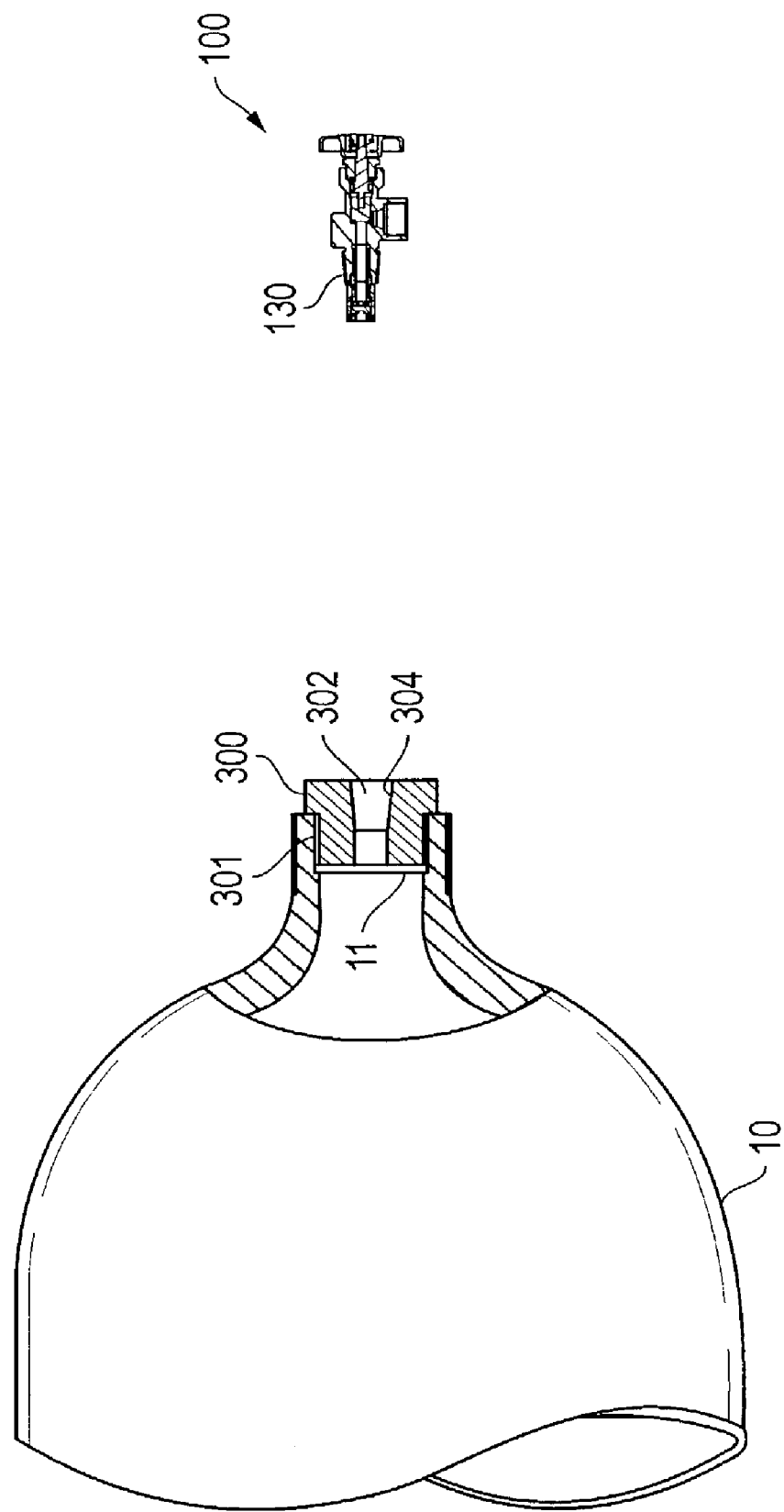
FIG. 3 is an exploded view of a valve and a springless shear protection device's interaction with a compressed gas cylinder according to one embodiment of the present invention.

Referring now to the figures, FIGS. 2a, 2b, 2c, 2d, 2e, 2f, 2g, 2h and 3 are exploded, side, top and bottom views of a valve and springless shear protection device and the interaction of same with a compressed gas cylinder according to one embodiment of the present invention. As shown in FIGS. 2a, 2b and 3, a bullplug 300 attaches to a cylinder 10. In one disclosed embodiment, the bullplug 300 includes male straight threads 301 that screw directly into the reciprocal female straight threads 11 of a compressed gas cylinder 10. An "O" ring (typically made of rubber) and a backup ring (typically made of a synthetic, fluorine-containing resin such as TEFLON) (neither shown) create a seal between the bullplug 300 and the cylinder 10. The bullplug 300 includes a bore 302 which is in fluid communication with the pressurized contents of the cylinder 10. A valve 103 and a shear protection device 101 attach to form a valve and springless shear protection device 100 which attaches onto the downstream side of bullplug 300, allowing the operator to manually control gas or liquid flow from the cylinder 10. In one disclosed embodiment, the bullplug 300 includes female straight threads 304 on the downstream side that screw directly onto reciprocal male straight threads 130 of the valve and springless shear protection device 100. However, a variety of various attachment techniques are available without detracting from the spirit of the invention.

As is shown in FIGS. 2a, 2b, 2c, 2d, 2e, 2f, 2g and 2h, the valve and springless shear protection device 100 is formed from a valve 103 and a springless shear protection device 101. The springless shear protection device 101 includes a shear tube 109, a poppet 112, a seat plug 118 and a retainer plug 124. The valve 103 allows for the controlled escape of the pressurized contents of the cylinder 10. The valve 103 includes a handle 102 for opening and closing of the valve 103. When the valve 103 is in the open position, exit bore 104, which is substantially perpendicular to the main axis of the valve 103, is in fluid communication with inlet bore 106, which is concentric with the main axis, allowing a gas or liquid to pass through the valve 103. When the valve 103 is in the closed position, the fluid communication between the exit bore 104 and the inlet bore 106 is interrupted, preventing the compressed gas or fluid from passing from the inlet bore 104 to the exit bore 106. The valve 103 includes male straight threads 130 which mate the valve 103 to the bullplug 300. In another disclosed embodiment, the valve 103 includes male tapered threads 130. The valve 103 further includes female straight threads 160 tapped to the inlet bore 106. The female straight threads 160 accept male straight threads 132 of the springless shear protection device 101.

The inlet bore 106 is bored to multiple different diameters. The first inner, smaller diameter portion of the inlet bore 106 is in fluid communication the second inner, larger diameter portion of the inlet bore 106. The first inner diameter portion and the second inner diameter portion of the inlet bore 106 form a flat annular surface 111 at the transition between the first and second diameter bores. The second inner, larger diameter portion of the inlet bore 106 accepts the shear tube 109 and the shear tube 109 attaches to the flat annular surface 111.

The shear tube 109 includes a shear tube bore 108 which is in fluid communication with the inlet bore 106. The shear tube 109 has a first outer diameter and a second outer diameter. The first outer diameter is substantial equal to the second inner, larger diameter of the inlet bore 106. The second diameter of the shear tube 109 is smaller than the first diameter. The first diameter of the shear tube 109 forms a continuous flange 133 around the periphery of the shear tube 109. When the shear tube 109 is installed in the inlet bore 106, the continuous flange 133 abuts the flat annular surface 111 of the valve 103. In one disclosed embodiment, the shear tube continuous flange 133 is press fit to the inlet bore 106, abutting the flat annular surface 111. When installed, the shear tube 109 extends beyond the body of the valve 103 into the poppet bore 114 providing fluid communication for poppet bore 114 with shear tube bore 108 which remains in fluid communication with inlet bore 106. The shear tube bore 108 and the inlet bore 106 have substantially equal inner diameters. In one disclosed embodiment, the shear tube 109 is formed from brass, however, a wide variety of materials may be used to form the shear tube 109 without detracting from the spirit of the invention, including but not limited to stainless steel.

The poppet 112 is substantially tubular and includes male straight threads 132 extended from the downstream end of the poppet 112. The poppet 112 includes a poppet bore 114 through the main axis of the poppet 112. The male straight threads 132 mate the poppet 112 to the female straight threads 160 of the valve 103. When the poppet 112 and the valve 103 are mated, the shear tube 109 extends from the inlet bore 106 to within the downstream end of the poppet bore 114. A seal gasket 110 is positioned between the valve 103 and the poppet 112 and seals the threaded connection to prevent leakage of the compressed gas or liquid.

The poppet bore 114 is bored to three different diameters. The first inner poppet diameter portion is bored to a diameter larger than the diameter of the shear tube 109 and forms a first inner poppet wall 154. An intermediate inner poppet diameter portion is bored to a diameter larger than the first inner poppet diameter, but smaller than a third inner poppet diameter and forms an intermediate inner poppet wall 152. The third inner poppet diameter portion is bored to a diameter substantially equal to the diameter of the retainer plug 124 and forms a third inner poppet wall 150. The width of the shell of the first inner poppet diameter portion, including the male straight threads 132, corresponds to the width of the female straight threads 160 of the valve 103. The remaining outer poppet diameter portion is substantially equal to the outer diameter of the upstream end of the valve 103 where the valve 103 and poppet 112 mate.

The first inner poppet diameter portion and the intermediate inner poppet diameter have a tapered connection. The intermediate inner poppet diameter portion and the third inner poppet diameter portion for an annular surface which is expanded radially to form a groove within the poppet bore 114 with a diameter greater than the third inner poppet diameter and the intermediate inner poppet diameter. The groove accepts an O-ring seal 116, where the inner diameter of the O-ring seal is smaller than the third inner poppet diameter and the intermediate inner poppet diameter.

The poppet 112 includes ventilation passages 128 which extend through the main body of the poppet 112 and form a substantial ring around the circumference. In one disclosed embodiment, the ventilation passages 128 exist in pairs on opposed sides of the poppet 112. In another disclosed embodiment, multiple sets of ventilation passages 128 are provided in the poppet 112. The ventilation passages 128 are in fluid communication with the poppet bore 114. The poppet 112 further includes female straight threads 148 at the upstream end. The female straight threads 148 accept male straight threads 125 of the retainer plug 124. In one disclosed embodiment, the poppet is formed from stainless steel, however, a wide variety of materials may be used to form the poppet without detracting from the spirit of the invention, including but not limited to brass.

The retainer plug 124 includes a bore 126 and pressure cavities 134. The bore 126 extends through the main axis of the retainer plug 124 while the pressure cavities 134 extend partially through the retainer plug. The pressure cavities 134 extend from the upstream end of the retainer plug 124, the end closest to the cylinder 10, but do not extend through to the downstream end. A tightening tool (not shown) may be inserted into the pressure cavities to assist in inserting the retainer plug 124 into the poppet 112. The outer shell of the retainer plug 124 is formed by the male straight threads 125 which mate the retainer plug 124 to the poppet 112. A flange 136 extends across the diameter of the downstream end of the retainer plug 124 and is perpendicular to the axis of the bore 126 which passes through the flange 136. The flange 136 interacts with notch 138 of the seat plug 118. In one disclosed embodiment, the retainer plug 124 is formed from brass, however, a wide variety of materials may be used to form the retainer plug 124 without detracting from the spirit of the invention, including but not limited to stainless steel.

The seat plug 118 includes a base portion 137 and a tube portion 139. The upstream end of the base portion 137 forms a notch 138 which interacts with the flange 136. The base portion 137 diameter is smaller than the third inner poppet diameter and the retainer plug 124 diameter. The base portion 137 does not include a bore. The base portion 137 is fixedly attached to, or formed as a single unit with, the tube portion 139 forming a tapered connection.

The tube portion 139 includes a seat plug bore 120 which is bored to a diameter substantially equal to the shear tube bore 108 diameter. The tube portion 139 includes two outer diameters 146, 142 respectively, with a tapered connection. At the downstream end of the seat plug 118, the first outer diameter 146 is substantially equal to the diameter of the shear tube 109, which is smaller than the first inner poppet diameter. The second outer diameter 142 has a tapered connection to the first outer diameter 146 and is smaller than the intermediate inner poppet diameter and is larger than the first inner poppet diameter. The tapered connection of the tube portion 109 is substantially equal to in length and pitch to the tapered connection between the first inner poppet diameter portion and the intermediate inner poppet diameter portion tapered connection.

The tube portion 139 includes ventilation passages 122 which extend through the tube portion 139 of the seat plug 118 and form a substantial ring around the circumference. In one disclosed embodiment, the ventilation passages 122 exist in pairs on opposed sides of the seat plug 118. In another disclosed embodiment, multiple sets of ventilation passages 122 are provided in the seat plug 118. The ventilation passages 122 are in fluid communication with the seat plug bore 120, the poppet bore 114 and the shear tube bore 108. In one disclosed embodiment, the ventilation passages 122 and 128 are correlated such that equivalent pairs of ventilation passages 122 and 128 are aligned on the same axis. In one disclosed embodiment, the diameters of the ventilation passages 122 and 128 are substantially equal.

When the valve 103 and the springless shear protection device 101 are attached to form the valve and shear protection device 100, compressed gas or liquid passes through the valve and the springless shear protection device 100 through manual control. When the valve and the springless shear protection device are assembled, the shear tube 109 is fixedly attached to the valve 103 at annular surface 111. The shear tube 109 extends beyond the valve 103 into the poppet bore 114. The seat plug 118 is loosely disposed in the poppet bore 114 and is enclosed at the upstream end by the threaded attachment of the retainer plug 124 to the poppet 112. The poppet 112 is threadedly attached to the valve 103 at the poppet's 112 downstream end.

In this configuration, the upstream end of the shear tube 109 abuts the downstream end of the seat plug 118, forcing the seat plug 118 to abut the retainer plug 124 and inserts flange 136 into notch 138. The ventilation passages 128 of the poppet 112 and the ventilation passages 122 of the seat plug 118 align and allow fluid communication of the compressed gas or liquid in the cylinder 10 with the seat plug bore 120 and the shear tube bore 108. In one disclosed embodiment, the ventilation passages of the poppet 112 and the ventilation passages 122 of the seat plug 118 do not align. Fluid communication of the compressed gas or liquid in the cylinder 10 with the seat plug bore 120 and the shear tube bore 108 is accomplished as the poppet bore 114 is intermediate to the seat plug bore 120 and the shear tube bore 108 and is in fluid communication with both.

The compressed gas or liquid in the cylinder 10 places a force directed downstream on the upstream end of the seat plug 118. The compressed gas or liquid of the cylinder 10 passes through the retainer plug bore 126 and abuts the upstream end of the seat plug 118. However, the seat plug 118 remains abutted to the retainer plug 124 as a result of the shear tube 109 abutting the downstream end of the seat plug 118. The upstream force of the shear tube 109 is greater than the downstream force of the compressed gas or liquid in the cylinder 10.

In the event of a shearing of the valve 103 of the valve and springless shear protection device 100, the shear tube 109 is removed as an upstream force. The downstream force of the compressed gas or liquid moves the seat plug 118 from abutting the retainer plug 124 to abutting the downstream end of the poppet bore 114. The base portion 137 engages the O-ring 116 located in the poppet bore 114 and forms a barrier. The compressed gas or liquid entering the poppet bore 114 either through the ventilation passages 128 or through the retainer plug bore 126 abuts the downstream end of the seat plug 118. The ventilation passages 122 of the seat plug 118 are no longer in fluid communication with the compressed gas or liquid. The internal pressure of the compressed gas or liquid maintains pressure on the seat plug 118 thereby forming a seal between the seat plug 118 and the poppet 112 and the O-ring 116.

Figure 4:
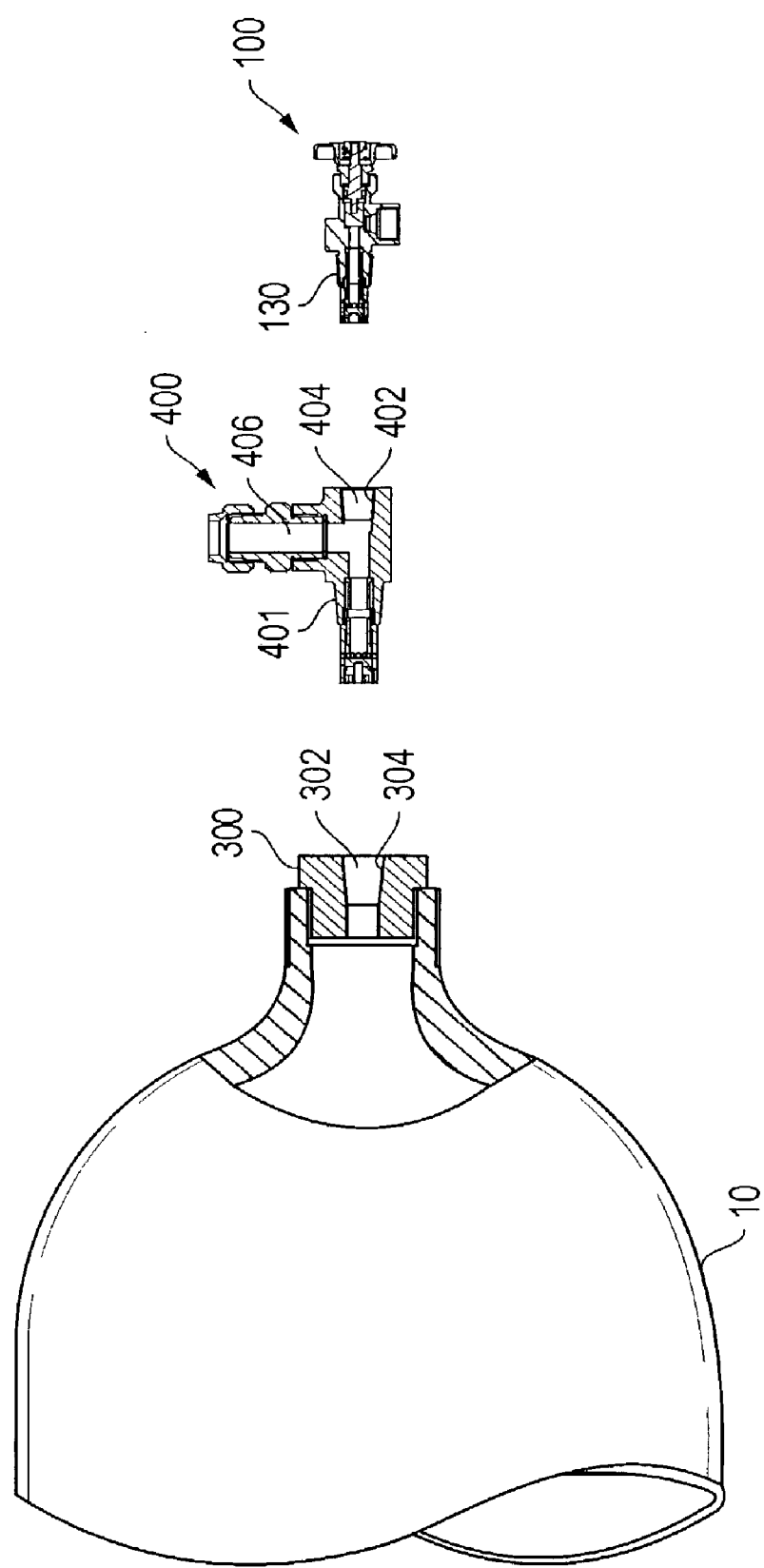
FIG. 4 is an exploded view of a valve and two springless shear protection device's interaction with a compressed gas cylinder according to another embodiment of the present invention.

Referring now to FIGS. 4, 5a and 5b, a valve with two springless shear protection devices is shown. A valve and springless shear protection device 100 attaches to a relief device 400. The valve and springless shear protection device 100 is substantially the same as disclosed above. The male straight (or tapered) threads 130 mate with the female straight (or tapered) threads 402 of the relief device 400. In one disclosed embodiment, the relief device is an angle-type relief device for truck-borne high pressure gas cylinders. Examples of such an angle-type relief device are shown in U.S. patent application Ser. No. 10/141,413 entitled "Method And Apparatus For Orbital And Seal Welded Relief Device On A Compressed Gas Cylinder," filed on May 8, 2002 by Steven K. Aderholt, Franklin B. Piehl and Dennis C. Hatfield which is hereby incorporated by reference for all purposes. The valve and springless shear protection device 100 is inserted into bore 402 at the downstream end of the relief device 400. A secondary bore 406 is in fluid communication with bore 402 and is perpendicular to bore 402 and the main axis of the relief device 400. At the upstream end of the relief device, a springless shear protection device 101 is attached, providing fluid communication of the springless shear protection device 100 with the inlet bore 408, the secondary bore 406 and the bore 402. The relief device 400 and the attached springless shear protection device 101 are attached to the cylinder 10. Male straight (or tapered) threads 401 mate with the female straight (or tapered) threads 304 of the bullplug 300 which is attached to the cylinder 10.

The relief device 400 includes a valve body 424 and a washer 422, rupture disc 420, shear ring 418, adapter 416, membrane 414, and flare nut 412. The valve body 424 includes a main body coaxial with the cylinder 10 and an integral riser portion 425 having an axis perpendicular to the main axis and the cylinder axis. The operation of the angle-type relief device 400 operate to relieve pressure if an over pressurization occurs.

The riser portion 425 of the valve body 424 protrudes beyond the outer diameter of the main body 423. This presents yet another opportunity for shear in the event of an accident, in this case the shear of the riser and the valve body 424 shear from the cylinder 10. The relief device 400 and the springless shear protection device 101 function as previously described. If the relief device 400 shears, the springless shear protection device 101 attached to the upstream end of the relief device 400 blocks the flow of the compressed gas or liquid. If the valve and springless shear protection device 100 shear, the downstream springless shear protection device 101 prevent the flow of the compressed gas or liquid.

Figure 7:
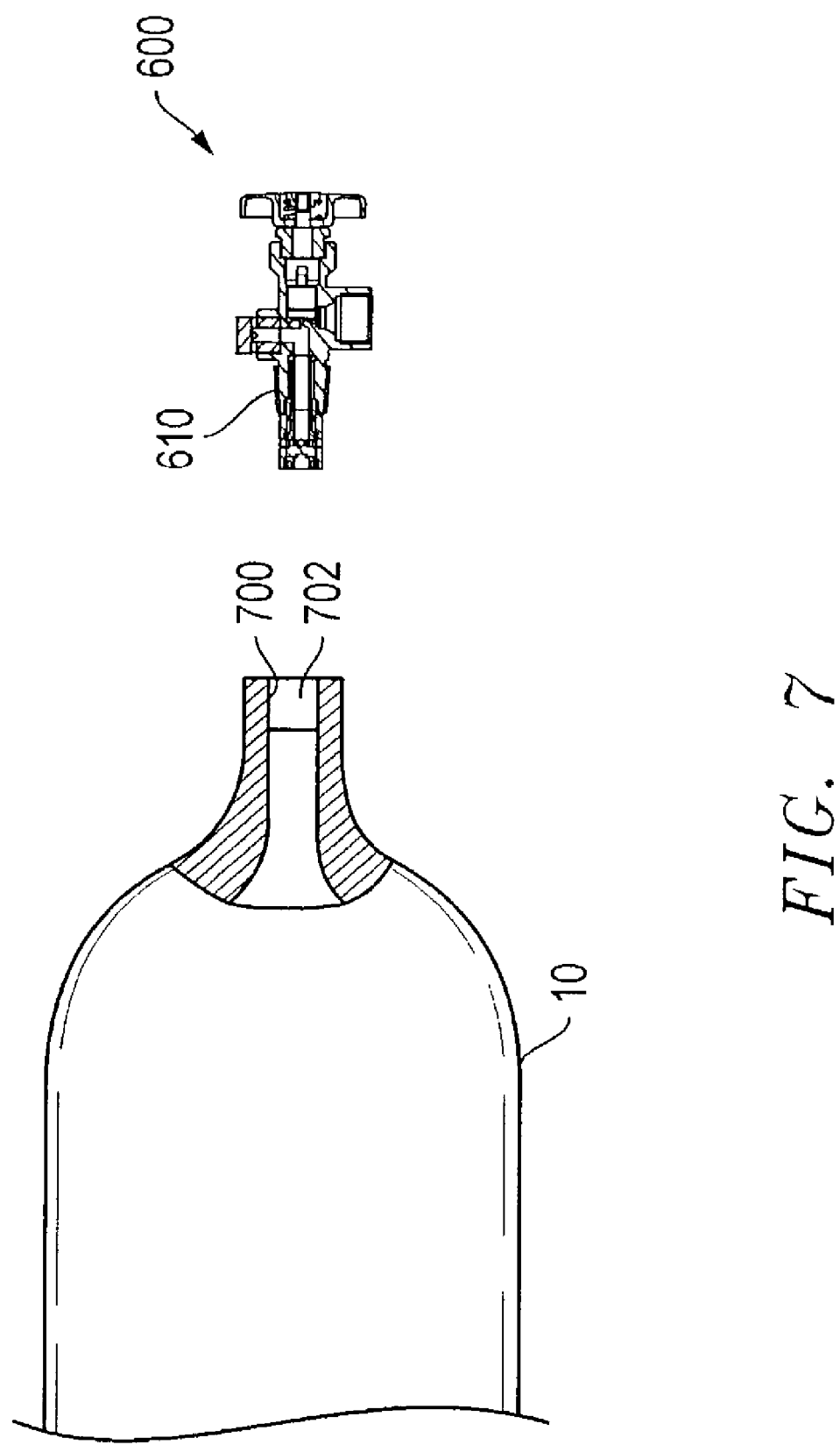
FIG. 7 is an exploded view of a valve and a springless shear protection device's interaction with a compressed gas cylinder according to another embodiment of the present invention.

Referring now to FIGS. 6a, 6b and 7 an alternate valve and springless shear protection device are shown. A valve 600 is shown attached to the springless shear protection device 101. The valve 600 includes two outlet bores 604 and 606. The outlet bores 604 and 606 are in fluid communication with inlet bore 608. The springless shear protection device 101 attaches to the valve 600 through male straight threads 132 and female straight threads 611. The springless shear protection device 101 includes the shear tube 109, the seal gasket 110, the poppet 112, the O-ring 116, the seat plug 118 and the retainer plug 124. In this embodiment, the larger diameter of the valve 600 male straight (or tapered) threads 610 allow for direct mating with the cylinder 10 without the need of an intermediary bullplug (not shown). The male straight (or tapered) threads 610 mate with the female straight (or tapered) threads 700 located in cylinder bore 702. The shear protection device's 101 diameter increase is proportional to the increase in the diameter of the valve 600 male straight (or tapered) threads 610. However, the diameter of the springless shear protection device 101 may vary without detracting from the spirit of the invention. The shearing protection function occurs as disclosed above if the valve 600 is sheared from the cylinder 10.

Figure 8:
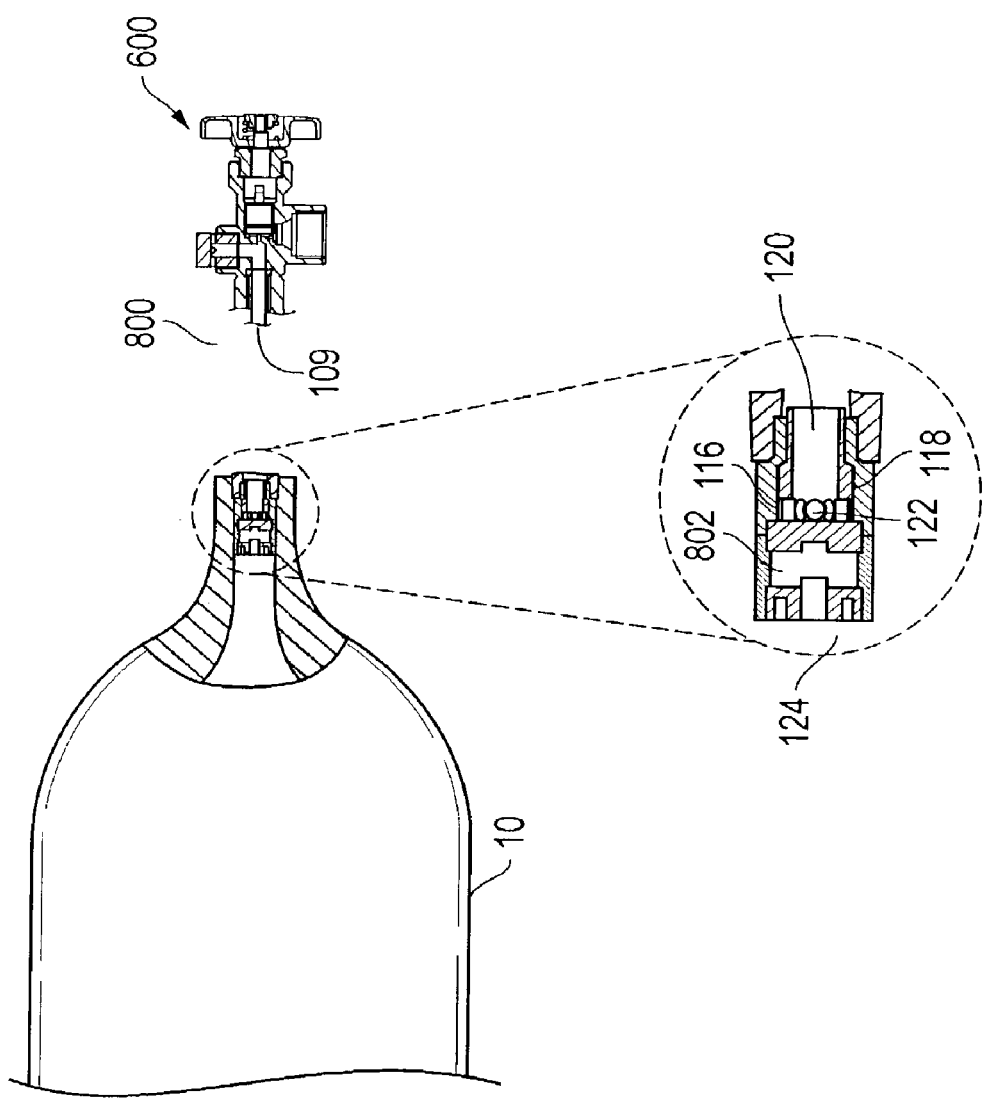
FIG. 8 is an exploded view of a valve and a springless shear protection device's interaction with a compressed gas cylinder after shearing according to another embodiment of the present invention.

Referring now to FIG. 8, an exploded view of a sheared valve and springless shear protection device is shown. The valve 600 is sheared 800 from the cylinder 10. When the valve 600 is sheared, the upstream force on the seat plug 118 from the shear tube 109 is removed and the seat plug is forced downstream by the internal force of the compressed gas or liquid in the cylinder 10. The seat plug 118 engages the O-ring 116 and forms a barrier to stop the escape of the compressed gas or liquid. Barrier space 802 is formed between the upstream end of the seat plug 118 and the retainer plug 124. As the ventilation passages 122 are moved downstream, the pressurized cylinder 10 contents are no longer in fluid communication with the seat plug bore 120.

Other embodiments of the invention will be apparent to those skilled in the art after considering this specification or practicing the disclosed invention. The specification and examples above are exemplary only, with the true scope of the invention being indicated by the following claims.

We claim the following invention:

1. A shear protection device for use with a valve, the device comprising:
    a poppet, said poppet including a bore and wherein said poppet includes first and second openings at distal ends of said poppet;
    a retainer plug attached to the second opening of said poppet, said retainer plug enclosing said poppet bore;
    a seat plug disposed in said poppet bore, wherein said seat plug is moveable within said poppet bore;
    said poppet and said retainer being constructed and arranged to envelope said seat plug;
    a shear tube with first and second ends extending through said first opening of said poppet, said first end abutting said seat plug through said first opening of said poppet and wherein said shear tube displaces said seat plug from the top of said poppet bore;
    said shear tube being constructed and arranged to secure said seat plug against said retainer plug;
    wherein when said poppet is attachable to the valve, a compressed gas or liquid passes through the poppet into the valve; and
    wherein said compressed gas or liquid causes said seat plug to forcibly engage the top of said poppet bore when said shear tube is removed and wherein said seat plug blocks the flow of the gas or liquid.

2. The shear protection device of claim 1, wherein said bore of said poppet includes at least two diameters.

3. The shear protection device of claim 1, wherein said poppet includes at least one ventilation opening.

4. The shear protection device of claim 3, wherein said poppet includes ventilation openings around the periphery of said poppet.

5. The shear protection device of claim 4, wherein said ventilation openings around the periphery of said poppet are opposed across said poppet bore.

6. The shear protection device of claim 5, wherein said ventilation openings opposed-include four sets of ventilation openings.

7. The shear protection device of claim 1, wherein said poppet includes an O-ring positioned in said poppet bore.

8. The shear protection device of claim 7, wherein said retainer plug at least one ventilation shaft.

9. The shear protection device of claim 1, wherein said shear tube includes a second end attached to the valve.

10. The shear protection device of claim 9, wherein said second end of said shear tube is press fit to the valve.

11. The shear protection device of claim 1, wherein said shear tube is made from brass.

12. The shear protection device of claim 1, wherein the valve includes a relief device.

13. The shear protection device of claim 12, wherein said relief device operates to release said compressed gas or liquid.

14. The shear protection device of claim 1, wherein said poppet is manufactured from stainless steel.

15. The shear protection device of claim 1, wherein said second end of said shear tube is fixedly attached to the valve.

16. A shear protection system, said system comprising:
    a cylinder for containing a compressed gas or liquid;
    a valve connected to said cylinder, said valve including an inlet; and
    a shear protection device intermediate said cylinder and said valve, said shear protection device including:
    a poppet, said poppet including a bore and wherein said poppet includes first and second openings at distal ends of said poppet;
    a retainer plug attached to the second opening of said poppet, said retainer plug enclosing said poppet bore;
    a seat plug disposed in said poppet bore, wherein said seat plug is moveable within said poppet bore;
    said poppet and said retainer plug being constructed and arranged to envelope said seat plug;
    a shear tube with first and second ends extending through said first opening of said poppet, said first end abutting said seat plug through said first opening of said poppet and wherein said shear tube displaces said seat plug from the top of said poppet bore, and wherein the second end of said shear tube attaches to the inlet of said valve;
    said shear tube being constructed and arranged to secure said set plug against said retainer plug;
    wherein said compressed gas or liquid passes through said poppet into said valve; and
    wherein said seat plug forcibly engages the top of said poppet bore when said shear tube is removed, blocking the flow of said compressed gas or liquid.

17. The shear protection system of claim 16, wherein said valve includes a relief device.

18. The shear protection system of claim 16 further including a mobile trailer connected to said cylinder, said mobile trailer for the transportation of said cylinder, said valve and said shear protection device.

19. The shear protection system of claim 16 further comprising a second shear protection device connected to said valve.

20. The shear protection system of claim 19, wherein said second shear protection device is located in series with said first shear protection device.

21. The shear protection system of claim 19, wherein said second shear protection device-includes:
- a second poppet, said second poppet including a bore and wherein said second poppet includes first and second openings at distal ends of said second poppet;
- a second seat plug disposed in said second poppet bore, wherein said second seat plug is moveable within said second poppet bore;
- a second shear tube with first and second ends extending through said first opening of said second poppet, said first end of the second shear tube abutting said second seat plug through said first opening of said second poppet and wherein said second shear tube displaces said second seat plug from the top of said second poppet bore;
- wherein compressed gas or liquid passes through said second poppet into said valve; and
- wherein said second seat plug forcibly engages the top of said second poppet bore when said second shear tube is removed, blocking the flow of said compressed gas or liquid.

22. The shear protection system of claim 21, wherein the first and second shear protection devices are on substantially the same axis.

23. The shear protection system of claim 16, wherein said first shear protection device mates directly with said cylinder.

24. The shear protection system of claim 16 further including a bullplug between said cylinder and said first shear protection device, wherein said bullplug includes first and second threaded connections, wherein said first threaded connection mates with said cylinder.

25. The shear protection system of claim 24, wherein a diameter of said first threaded connection is larger than the diameter of said second threaded connection.

26. A shear protection device, said shear protection device comprising:
- a poppet, said poppet including a bore and wherein said bore includes at least two diameters and wherein said poppet includes at least one ventilation opening and wherein said poppet includes first and second openings at distal ends of said poppet;
- a seat plug disposed in the poppet bore, wherein said seat plug is moveable within said poppet bore;
- a retainer plug attached to the second opening of the poppet, said retainer plug enclosing said poppet bore and wherein said poppet and said retainer plug envelope said seat plug, wherein said retainer plug includes at least one ventilation shaft;
- a shear tube with first and second ends extending through said first opening of said poppet, said first end abutting said seat plug and said second end attached to a valve and wherein said shear tube engages said seat plug against said retainer plug when attached to the valve;
- wherein said poppet is attachable to the valve, when attached, a compressed gas or liquid can pass through said poppet into the valve;
- wherein said seat plug is forcibly engaging the top of said poppet bore when said shear tube is removed and wherein said seat plug blocks the flow of said compressed gas or liquid.

* * * * *